United States Patent
Lisoski et al.

(10) Patent No.: US 12,430,958 B2
(45) Date of Patent: Sep. 30, 2025

(54) SYSTEMS AND METHODS FOR DISTRIBUTED CONTROL COMPUTING FOR A HIGH ALTITUDE LONG ENDURANCE AIRCRAFT

(71) Applicant: AEROVIRONMENT, INC., Arlington, VA (US)

(72) Inventors: Derek Lisoski, Simi Valley, CA (US); William Stuart Sechrist, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 206 days.

(21) Appl. No.: 17/605,716

(22) PCT Filed: Apr. 23, 2020

(86) PCT No.: PCT/US2020/029640
§ 371 (c)(1),
(2) Date: Oct. 22, 2021

(87) PCT Pub. No.: WO2020/219765
PCT Pub. Date: Oct. 29, 2020

(65) Prior Publication Data
US 2022/0122385 A1  Apr. 21, 2022

Related U.S. Application Data

(60) Provisional application No. 62/855,593, filed on May 31, 2019, provisional application No. 62/838,783, (Continued)

(51) Int. Cl.
*G07C 5/08* (2006.01)
*B64D 43/00* (2006.01)

(52) U.S. Cl.
CPC ........... *G07C 5/0808* (2013.01); *B64D 43/00* (2013.01)

(58) Field of Classification Search
CPC ....... B64D 43/00; B64D 1/00-2241/00; G07C 5/0808; G05B 9/03; G05B 19/0428;
(Continued)

(56) References Cited

U.S. PATENT DOCUMENTS

| | | | |
|---|---|---|---|
| 2,478,758 A | 8/1949 | Frieder et al. | |
| 2,898,058 A | 8/1959 | Del | |

(Continued)

FOREIGN PATENT DOCUMENTS

| | | |
|---|---|---|
| AU | 2007200943 A1 | 9/2007 |
| DE | 102017102481 A1 | 8/2018 |

(Continued)

OTHER PUBLICATIONS

International Search Report for PCT/US2020/029640 mailed on Jul. 16, 2020.

(Continued)

*Primary Examiner* — Mohamed Abdo Algehaim
(74) *Attorney, Agent, or Firm* — Command IP LLP; Pejman Yedidsion; Eric Aagaard (57) ABSTRACT

Systems, devices, and methods including a first flight control computer (FCC) of two or more FCCs; a second FCC of the two or more FCCs; at least one selector in communication with the first FCC; and at least one watchdog window in communication with the at least one selector, where the at least one watchdog window monitors a performance of the first FCC based on an electrical pulse emitted by the FCC; where the at least one watchdog window is configured to detect a fault pulse of the electrical pulse emitted by the first
(Continued)

FCC; and where the selector is configured to toggle to the second FCC based on the detected fault pulse emitted by the first FCC.

10 Claims, 9 Drawing Sheets

Related U.S. Application Data filed on Apr. 25, 2019, provisional application No. 62/838,833, filed on Apr. 25, 2019.

(58) Field of Classification Search
CPC ............ G06F 11/0793; G06F 11/3013; G06F 11/0754; G06F 11/2038; G06F 11/0739
USPC ........................................ 701/29.2
See application file for complete search history.

(56) References Cited

U.S. PATENT DOCUMENTS

| | | | | |
|---|---|---|---|---|
| 4,589,066 | A * | 5/1986 | Lam .................. | G06F 11/1691 439/857 |
| 4,916,612 | A * | 4/1990 | Chin .................. | G05B 9/03 701/16 |
| 5,175,712 | A | 12/1992 | Vaccaro et al. | |
| 5,313,625 | A * | 5/1994 | Hess .................. | G06F 11/1633 714/E11.061 |
| 5,349,654 | A * | 9/1994 | Bond .................. | G06F 11/2007 714/45 |
| 5,552,985 | A * | 9/1996 | Hori .................. | B60K 31/047 180/170 |
| 5,810,284 | A | 9/1998 | Hibbs et al. | |
| 5,903,717 | A * | 5/1999 | Wardrop ............ | G06F 11/1658 714/E11.069 |
| 6,056,237 | A | 5/2000 | Woodland | |
| 6,550,018 | B1 * | 4/2003 | Abonamah .......... | G05B 9/03 714/6.32 |
| 6,684,275 | B1 | 1/2004 | Goldstein ........... | G11C 7/1006 710/2 |
| 6,697,973 | B1 * | 2/2004 | Baumeister, IV .. | G06F 11/0721 714/45 |
| 8,191,831 | B2 | 6/2012 | Nadir | |
| 8,577,519 | B1 * | 11/2013 | Varnavas ........... | H04B 7/18519 701/3 |
| 8,948,960 | B2 * | 2/2015 | Griffith .............. | G06F 11/182 244/99.2 |
| 9,527,605 | B1 | 12/2016 | Gentry et al. | |
| 9,654,200 | B2 | 5/2017 | Mazzarella et al. | |
| 9,694,894 | B2 | 7/2017 | Deakin | |
| 9,959,773 | B2 * | 5/2018 | Raptopoulos ....... | G05D 1/0088 |
| 10,005,541 | B2 | 6/2018 | Karem et al. | |
| 10,095,242 | B1 | 10/2018 | Novak | |
| 10,155,588 | B2 | 12/2018 | Fisher et al. | |
| 10,476,296 | B1 | 11/2019 | Rausch et al. | |
| 2005/0034015 | A1 * | 2/2005 | Hashimoto ......... | G06F 11/0736 714/E11.003 |
| 2006/0278757 | A1 | 12/2006 | Kelleher | |
| 2007/0168711 | A1 * | 7/2007 | Chen .................. | G06F 11/2025 714/E11.073 |
| 2008/0033604 | A1 | 2/2008 | Margolin | |
| 2009/0037770 | A1 * | 2/2009 | Troppmann ........ | G06F 11/0757 714/24 |
| 2009/0044050 | A1 * | 2/2009 | Maimone ........... | G06F 11/0757 714/15 |
| 2010/0049268 | A1 * | 2/2010 | Martins .............. | G06F 11/2025 607/9 |
| 2010/0168939 | A1 | 7/2010 | Doeppner et al. | |
| 2010/0292873 | A1 | 11/2010 | Duggan et al. | |
| 2011/0137496 | A1 | 6/2011 | Everett et al. | |
| 2011/0282502 | A1 | 11/2011 | Fife et al. | |
| 2012/0072058 | A1 * | 3/2012 | Regmi ................ | G08G 5/58 701/3 |
| 2012/0110374 | A1 * | 5/2012 | Brewerton ......... | G06F 11/0754 714/E11.206 |
| 2013/0062457 | A1 | 3/2013 | Deakin | |
| 2013/0135030 | A1 * | 5/2013 | Barrenscheen .... | G05B 19/0428 327/355 |
| 2014/0021288 | A1 | 1/2014 | Elson et al. | |
| 2014/0032034 | A1 | 1/2014 | Raptopoulos et al. | |
| 2014/0188776 | A1 | 7/2014 | Shuster et al. | |
| 2014/0257684 | A1 | 9/2014 | Wilder et al. | |
| 2014/0316616 | A1 | 10/2014 | Kugelmass | |
| 2015/0066248 | A1 | 3/2015 | Arbeit et al. | |
| 2015/0097071 | A1 | 4/2015 | Frolov et al. | |
| 2015/0097079 | A1 | 4/2015 | Frolov et al. | |
| 2015/0102172 | A1 | 4/2015 | Thurn | |
| 2015/0115106 | A1 | 4/2015 | Coffey et al. | |
| 2015/0203200 | A1 | 7/2015 | Bye et al. | |
| 2015/0314741 | A1 * | 11/2015 | Ueta .................. | H05B 47/21 307/9.1 |
| 2015/0327136 | A1 | 11/2015 | Kim et al. | |
| 2015/0336671 | A1 * | 11/2015 | Winn .................. | G05D 1/0202 701/3 |
| 2016/0009390 | A1 | 1/2016 | Kugelmass et al. | |
| 2016/0009402 | A1 | 1/2016 | Hunter | |
| 2016/0039541 | A1 | 2/2016 | Beardsley et al. | |
| 2016/0075452 | A1 | 3/2016 | Robles et al. | |
| 2016/0202701 | A1 * | 7/2016 | Burte .................. | B64C 13/505 701/3 |
| 2016/0244152 | A1 * | 8/2016 | Coffman ............. | F16D 28/00 |
| 2016/0292696 | A1 | 10/2016 | Gong et al. | |
| 2016/0307448 | A1 | 10/2016 | Salnikov et al. | |
| 2016/0347467 | A1 | 12/2016 | Salesse-Lavergne et al. | |
| 2016/0368590 | A1 | 12/2016 | Karem et al. | |
| 2017/0069145 | A1 * | 3/2017 | Dorkel ............... | G07C 5/006 |
| 2017/0137138 | A9 | 5/2017 | Hunter | |
| 2017/0195048 | A1 | 7/2017 | Sham | |
| 2017/0248125 | A1 | 8/2017 | Luchsinger et al. | |
| 2017/0334559 | A1 * | 11/2017 | Bouffard ............ | G08G 5/0034 |
| 2018/0009764 | A1 | 1/2018 | Mitchell et al. | |
| 2018/0048160 | A1 | 2/2018 | Narla et al. | |
| 2018/0068567 | A1 | 3/2018 | Gong et al. | |
| 2018/0090016 | A1 | 3/2018 | Nishi et al. | |
| 2018/0130363 | A1 | 5/2018 | Yvetot et al. | |
| 2018/0273170 | A1 | 9/2018 | D'Sa et al. | |
| 2018/0362158 | A1 | 12/2018 | Zhang et al. | |
| 2019/0107408 | A1 | 4/2019 | Stroman et al. | |
| 2019/0161190 | A1 | 5/2019 | Gil et al. | |
| 2019/0300185 | A1 | 10/2019 | Tang et al. | |
| 2019/0377021 | A1 * | 12/2019 | Bhalwankar ........ | G01R 15/202 |
| 2019/0378419 | A1 * | 12/2019 | Gansmandel ........ | G08G 5/34 |
| 2019/0389602 | A1 * | 12/2019 | Schilling ............ | B64G 1/26 |
| 2020/0092052 | A1 * | 3/2020 | MacAfee ............ | H04L 1/08 |
| 2020/0101571 | A1 | 4/2020 | Datas et al. | |
| 2020/0307780 | A1 * | 10/2020 | Worsham, II ...... | B64D 45/00 |
| 2021/0061027 | A1 * | 3/2021 | Da Deppo .......... | B60C 23/041 |
| 2021/0064063 | A1 | 3/2021 | Wakikawa | |
| 2021/0072772 | A1 | 3/2021 | Miyakawa et al. | |
| 2021/0080285 | A1 | 3/2021 | Connor | |
| 2021/0091848 | A1 | 3/2021 | Cai | |
| 2021/0258067 | A1 | 8/2021 | Hoshino et al. | |
| 2021/0319705 | A1 | 10/2021 | Furumoto | |
| 2022/0348356 | A1 | 11/2022 | Millspaugh | |
| 2024/0417105 | A1 | 12/2024 | Millspaugh | |

FOREIGN PATENT DOCUMENTS

| | | |
|---|---|---|
| EP | 2949516 A1 | 12/2015 |
| JP | s63644 A | 1/1988 |
| JP | H03137732 A | 6/1991 |
| JP | H0588926 A | 4/1993 |
| JP | 2001102801 A | 4/2001 |
| JP | 2003223338 A | 8/2003 |
| JP | 2004130852 A | 4/2004 |
| JP | 2005145090 A | 6/2005 |
| JP | 2008207705 A | 9/2008 |
| JP | 2019054490 A | 4/2020 |
| WO | 2017083406 A1 | 5/2017 |

(56) References Cited

FOREIGN PATENT DOCUMENTS

| WO | 2017130137 A1 | 8/2017 |
|---|---|---|
| WO | 2017197245 A1 | 11/2017 |
| WO | 2018234799 A1 | 12/2018 |

OTHER PUBLICATIONS

Fayyaz Muhammad et al.: "Survey and future directions of fault-tolerant distributed computing on board spacecraft", Advances in Space Research, Elsevier, Amsterdam, NL, vol. 58, No. 11, Aug. 22, 2016 (Aug. 22, 2016), pp. 2352-2375, XP029801074, ISSN: 0273-1177, DOI: 10.1016/J.ASR.2016.08.017 p. 2354, section 2.2 p. 2355, Fig. 1 and left column, 2nd paragraph p. 2360-2361:section 4.2.1.

Abraham et al, "Dynamic Optimization of High-Altitude Solar Aircraft Trajectories Under Station-Keeping Constraints", Journal of Guidance and Control and Dynamics, vol. 42, No. 3, Nov. 26, 2018, pp. 538-552.

Hosseini Saghar et al.: "Optimal path planning and power allocation for a long endurance solar-powered UAV", 2015 American Control Conference (ACC), IEEE, Jun. 17, 2013 (Jun. 17, 2013), pp. 2588-2593, XP032476633, ISSN: 0743-1619, DOI: 10.1109/ACC.2013.6580224 [retrieved on Aug. 14, 2013] p. 2589-p. 2592.

Lee Joo-Seok et al.: Flight path optimization of solar powered UAV for endurance flight, 2015 54th Annual Conference of The Society of Instrument and Control Engineers of Japan( (SICE),The Society of Instrument and Control Engineers—SICE, Jul. 28, 2015 (Jul. 28, 2015), pp. 820-823, XP033220597, DOI:10.1109/SICE.2015.7285496 [retrieved on Sep. 30, 2015] whole document.

Sumada Tomolawn, Miyagi, special : jet-engine digital control system for a microcomputer aircraft for carrying moving objects, research report of informationprocessing society, Japan, Incorporated Information Processing Society, Dec. 12, 1991, vol. 91, No. 109, pp. 1-8.

\* cited by examiner

SYSTEMS AND METHODS FOR DISTRIBUTED CONTROL COMPUTING FOR A HIGH ALTITUDE LONG ENDURANCE AIRCRAFT

CROSS-REFERENCE TO RELATED APPLICATION

This application is a 35 U.S.C § 371 National Stage Entry of International Application No. PCT/US2020/029640, filed Apr. 23, 2020, which claims priority to and the benefit of U.S. Provisional Patent Application No. 62/838,783, filed Apr. 25, 2019, U.S. Provisional Patent Application No. 62/838,833, filed Apr. 25, 2019, and U.S. Provisional Patent Application No. 62/855,593, filed May 31, 2019, the contents of all of which are hereby incorporated by reference herein for all purposes.

FIELD OF ENDEAVOR

The invention relates generally to flight control computers, and more particularly to flight control computers for an unmanned aerial vehicle (UAV).

BACKGROUND

Unmanned Aerial Vehicles (UAVs) are aircraft that may be capable of controlled, sustained flight. The UAV has no onboard pilot, and a flight control computer (FCC) onboard the UAV is the central intelligence of the aircraft. The FCC may include one or more processors and the FCC controls functionality of the UAV.

SUMMARY

A system embodiment may include: a first flight control computer (FCC) of two or more FCCs; a second FCC of the two or more FCCs; at least one selector in communication with the first FCC; and at least one watchdog window in communication with the at least one selector, where the at least one watchdog window monitors a performance of the first FCC based on an electrical pulse emitted by the FCC; where the at least one watchdog window may be configured to detect a fault pulse of the electrical pulse emitted by the first FCC; and where the selector may be configured to toggle to the second FCC based on the detected fault pulse emitted by the first FCC.

In additional system embodiments, the detected fault pulse may be a pulse that may be outside a preferred range. In additional system embodiments, the detected fault pulse may be a pulse that skips a beat. In additional system embodiments, the detected fault pulse may be a pulse that has a frequency and amplitude outside of a preferred range of a baseline pulse.

In additional system embodiments, the selector may be further configured to reset power to the first FCC. In additional system embodiments, the selector may be configured to toggle to the first FCC after power has been reset to the first FCC. In additional system embodiments, the at least one watchdog window may be further configured to monitor the performance of the first FCC after the first FCC may be toggled by the selector.

A method embodiment may include: monitoring, via a watchdog window, a performance of a first flight control computer (FCC) of two or more FCCs, where the performance may be based on an electrical pulse emitted by the first FCC; detecting, via the watchdog window, a fault pulse of the electrical pulse emitted by the first FCC; and toggling, by a selector in communication with the watchdog window, to a second FCC based on the detected fault pulse emitted by the first FCC.

In additional method embodiments, the detected fault pulse may be a pulse that may be outside a preferred range. In additional method embodiments, the detected fault pulse may be a pulse that skips a beat. In additional method embodiments, the detected fault pulse may be a pulse that has a frequency and amplitude outside of a preferred range of a baseline pulse.

Additional method embodiments may include: resetting, via the selector, power to the first FCC. Additional method embodiments may include: toggling, by the selector, to the first FCC after power has been reset to the first FCC. Additional method embodiments may include: monitoring, via the watchdog window, the performance of the first flight control computer (FCC) after the first FCC may be toggled by the selector.

A flight control computer embodiment may include: a field programmable gate array (FPGA); a flight control computer (FCC) processor in communication with the FPGA via an FCC bus; a plurality of serial ports in communication with the FPGA and FCC processor; and a controller chip in communication with the plurality of serial ports, where the controller chip may be configured to transform a parallel output of the FCC bus into a serial form for transmission though a serial port of the plurality of serial ports.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

System and method embodiments disclosed herein may include distributive control computing for a flight control computer (FCC) of an unmanned aerial vehicle (UAV). In one example, the UAV is a high altitude long endurance solar-powered aircraft. It is a challenge for FCCs to physically house all of the desired communication lines between the information processing system and an outside system, so-called "input/output" or "I/O". An FCC may be controlled and programmed with a field programmable gate array (FPGA). The FPGA is an integrated circuit that is field-programmable in the sense that it may be programmed after manufacturing to carry out one or more logical operations. The FPGA may be connected to a central processing unit (CPU) with a bus to handle all the requisite I/O. This point-to-point design establishes just a single connection per node of the aircraft's avionics, where each node is given a specific task. Such a configuration may lead to high serial traffic that can be taxing for the CPU.

Additionally, it may be important to have a system that monitors the performance of the FCC, such that the UAV may maintain flight in the event that the FCC is malfunctioning. UAVs may have at least two FCCs, with at least one of the FCCs acting as a backup in case the other FCC malfunctions. Furthermore, a matrix of checkers, or selectors, may monitor the performance of each FCC. If one FCC fails, the UAV may still sustain flight by switching to the backup FCC. This approach may be complicated and the chance of any one of the selectors failing may be increased due to an increased complexity. Furthermore, the matrix configuration may be challenging to debug, require substantial wiring, and be at a large expense to implement. Still further, the matrix configuration may require substantial power, and the architecture may be challenging to build.

In one embodiment, the FCC has a processor with an FPGA fabric proximate the processor. The FPGA is radiation tolerant to help shield the computer from high frequency solar radiation which may otherwise damage the electronics housed therein. Connected to the processor/FPGA system is a plurality of serial ports. A circuit may be created with the FPGA, providing enhanced flexibility for serial port to pin connections. In one embodiment, the FCC has an increased capacity of serial ports. In general, the constraints to the total number of serial ports are the number of physical I/O pins and the size of the FPGA. In one embodiment, twenty serial ports are disposed at the FCC providing substantial I/O. This configuration provides a so-called "party line", where all nodes of the aircraft's avionics are listening and communicating.

Each of the twenty serial ports may be connected to a different element of the flight control system. For instance, there may be ports for buses, data links, transponders, and the like. This system may require minimal maintenance and may accurately distribute control without over-taxing the processor. Furthermore, the system may operate at lower power. For example, a typical Ethernet connection configuration uses approximately one watt of power, whereas the FCC may have a power usage at an approximate range measured in milliWatts (mW) of power.

The system for distributive control computing for the above-described FCC further includes monitoring the performance of the FCC. More specifically, a system for auto-switch toggling from one FCC to another identical FCC in the event of malfunction is described herein. In one embodiment, a selector connected to the FCC may have a simple configuration, e.g., no logic gates, transistors, etc. Individual aspects of the selector may fail. However, there may be very few failure modes in the system due to the simplicity of the selector, and thus the reliability may be much higher.

In one embodiment, each FCC has a pulse or "watchdog" being generated by the FCC programming and the FCC circuitry. A watchdog window associated with the selector may detect the electrical pulse. If the watchdog window detects that performance specifications are not met, e.g., a lack of a pulse, then the selector may toggle to the second FCC, while the first FCC may be power cycled, e.g., shut off and turned back on. Additionally, power to the first FCC may be reset and any identified issues may be resolved. The FCC may be back up and running again in a short enough time that aircraft safety is assured. Therefore, the UAV can sustain continuous flight, since the selector has toggled to the healthy backup FCC.

Figure 1:
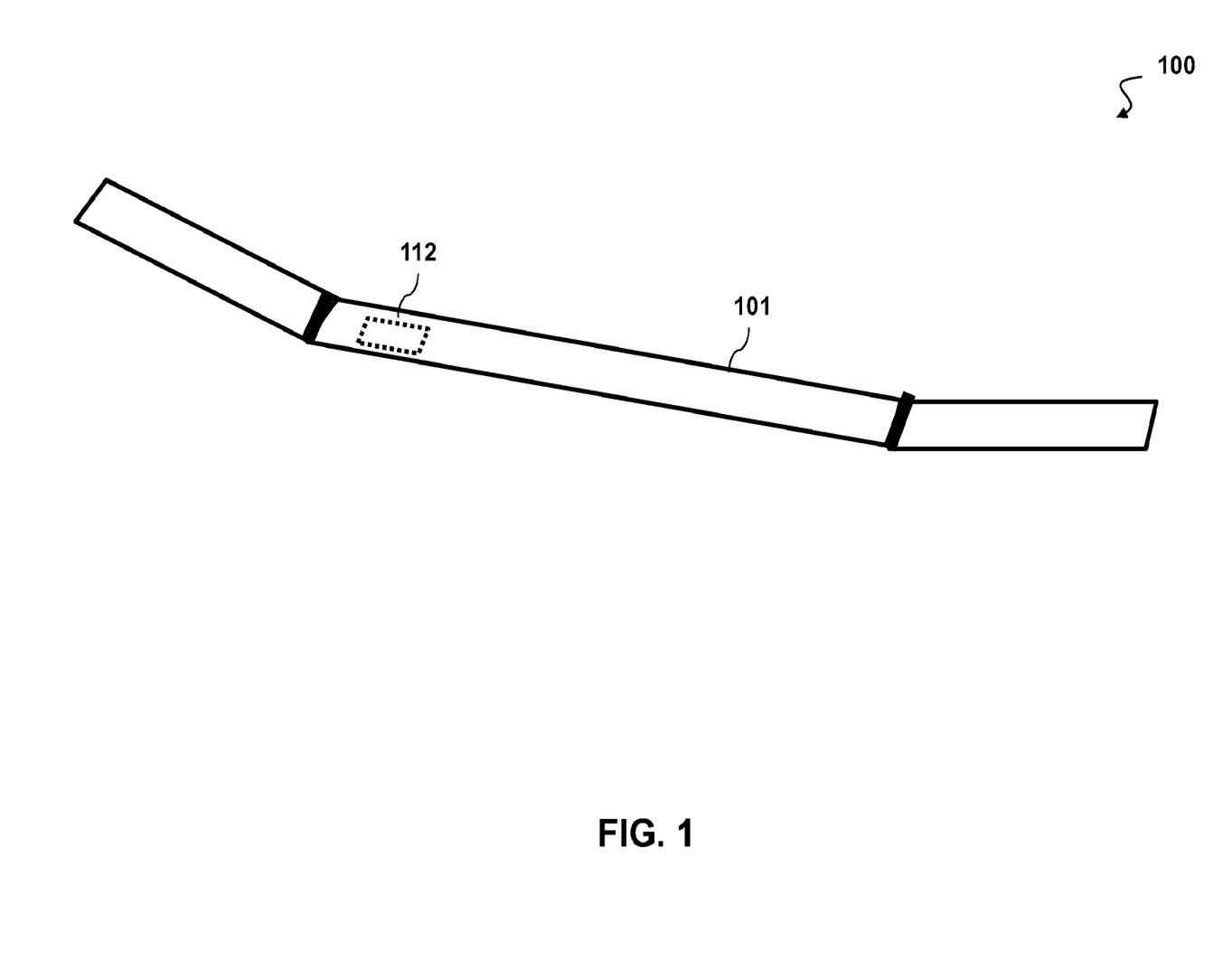
FIG. 1 depicts a system of an unmanned aerial vehicle having distributed control computing, according to one embodiment.

With respect to FIG. 1, a system 100 for distributive control computing for a flight control computer (FCC) 112 of an unmanned aerial vehicle (UAV) 101 is depicted. UAVs are aircraft with no onboard pilot and may fly autonomously or remotely. In one embodiment, the UAV 101 is a high altitude long endurance aircraft. In one embodiment, the UAV 101 may have one or more motors, for example, between one and forty motors, and a wingspan between one-hundred feet and 400 feet. In one embodiment, the UAV 101 has a wingspan of approximately 260 feet and is propelled by a plurality of motors, for example, ten electric motors, powered by a solar array covering the surface of the wing, resulting in zero emissions. Flying at an altitude of approximately 65,000 feet above sea level and above the clouds, the UAV 101 is designed for continuous, extended missions of up to months without landing.

The high altitude long endurance UAV 101 functions optimally at high altitude due at least in part to the lightweight payload of the UAV, and is capable of considerable periods of sustained flight without recourse to land. In one embodiment, the high altitude long endurance UAV 101 may weigh approximately 3,000 lbs and may include two or more outer wing panel sections and one or more center wing panel sections, providing for efficient assembly and disassembly of the UAV 101 due to the attachability and detachability of the wing panel sections to each other and/or to the center panel.

In one embodiment, the UAV 101 does not have an onboard pilot. Accordingly, a flight control computer (FCC) 112 onboard the UAV 101 is the central intelligence of the aircraft. The FCC 112 may partially or completely control much of the functionality of the UAV 101, such as determining a flight pattern, changing direction of the UAV 101, and the like. In one embodiment, the FCC 112 may determine a flight pattern based on weather conditions, the aims of the payload operators, flight patterns of other UAVs within the fleet, and various external sensors. In one embodiment, an operator determines a flight pattern of the UAV 101.

Figure 2:
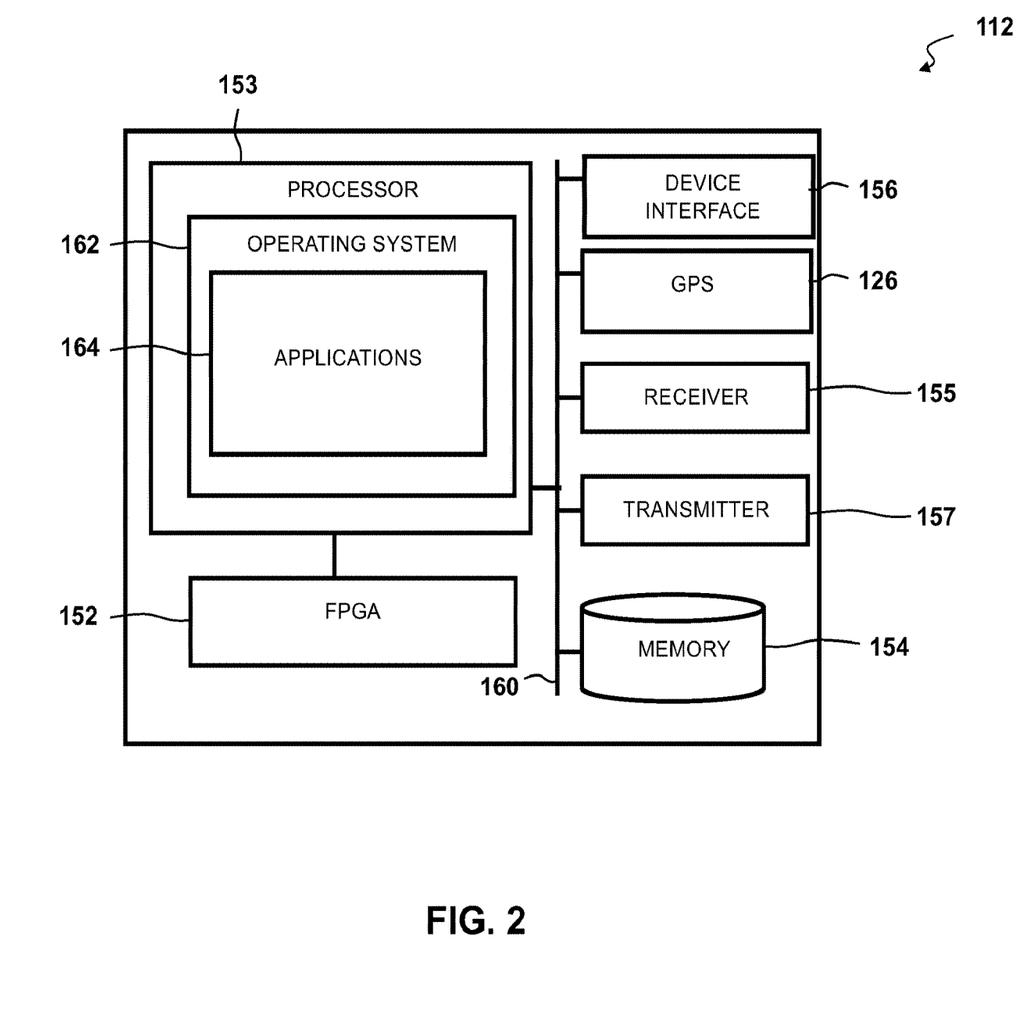
FIG. 2 illustrates a top-level functional block diagram of a computing device for distributed control computing, according to one embodiment.

FIG. 2 illustrates an example of a top-level functional block diagram of the FCC 112 of a high altitude long endurance aircraft. The FCC 112 includes at least a processor 153, such as a central processing unit (CPU), addressable memory 154, an external device interface 156, e.g., an optional universal serial bus port and related processing, and/or an Ethernet port and related processing, and an optional user interface, e.g., an array of status lights, sensors and one or more toggle switches, and/or a touch screen. Optionally, the addressable memory may, for example, be: flash memory, eprom, and/or a disk drive or other hard drive. These elements may be in communication with one another via a data bus 160.

In some embodiments, via an operating system 162 such as one supporting applications 164, the processor 153 may be configured to execute steps of a process establishing a communication channel.

The FCC 112 may be further connected to or in communication with a global positioning system (GPS) 126 configured for receiving position data from a constellation of satellites. Still further, the FCC 112 may include a transmitter 157 for transmitting to the ground repeated GPS signals and/or transmitting to the ground translated GPS signals in an auxiliary frequency band to a terrestrial RF receiver in cooperation with a terrestrial GPS receiver.

Figure 3:
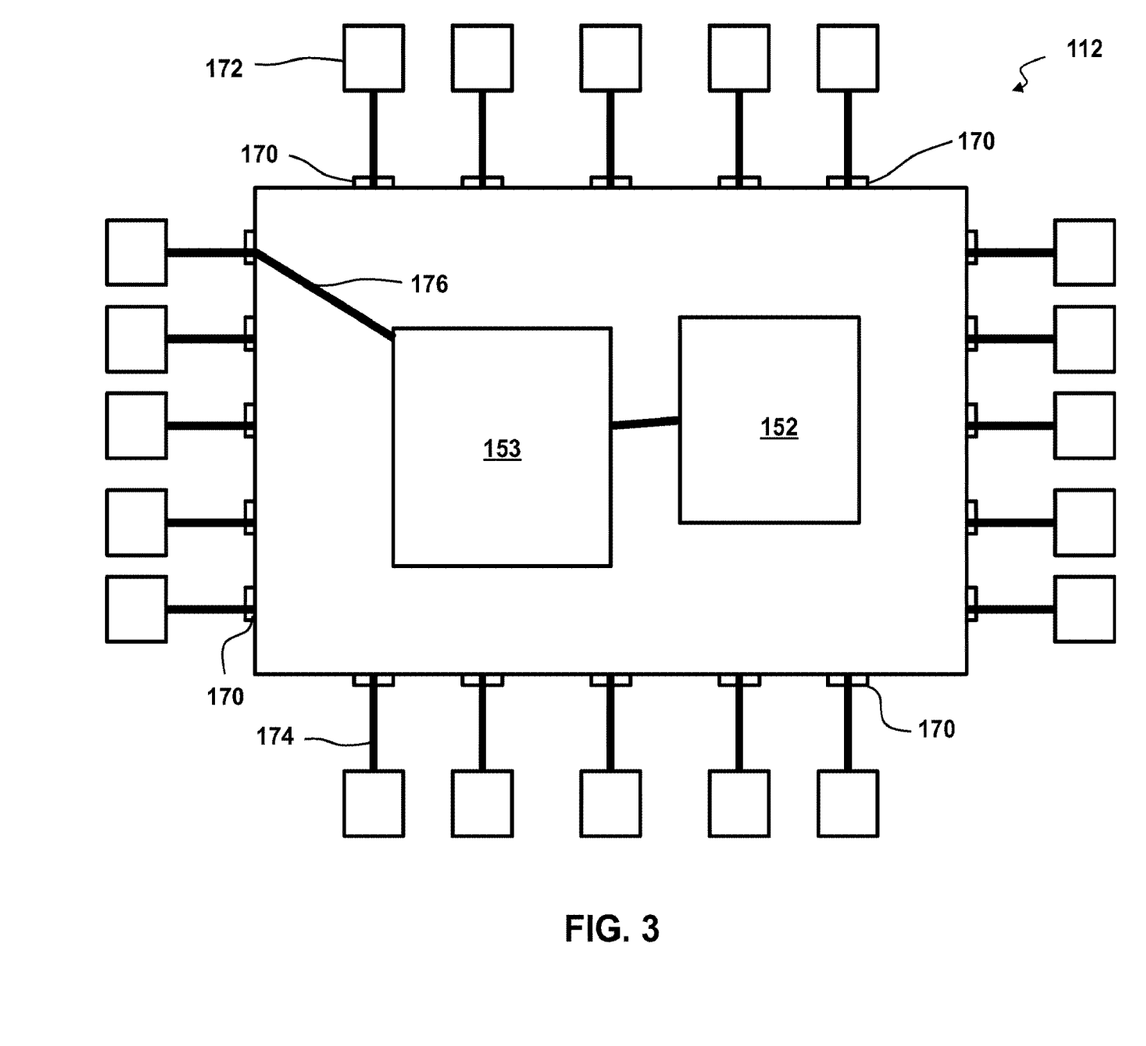
FIG. 3 depicts a computing device for distributed control computing including a plurality of serial ports, according to one embodiment.

With respect to FIG. 3, the FCC processor 153 may be connected to a field programmable gate array (FPGA) fabric 152. The FPGA 152 may be an integrated circuit that is field-programmable in the sense that the FPGA may be programmed after manufacturing to carry out one or more logical operations. More specifically, the FPGA 152 may include a collection of logic cells, or "lookup tables" (LUTs), that may be surrounded by an interconnect fabric. The LUTs and interconnect fabric are programmable providing for a system that may implement an algorithm. In one embodiment, the FPGA 152 may be reprogrammed to implement different logic functions, which in turn may provide for flexible reconfigurable computing.

The FPGA 152 may help expand the I/O capability of the processor 153. The FPGA 152 may have large resources of logic gates and RAM blocks to implement complex algorithms. The FPGA 152 architecture may consist of LUTs, routing channels and I/O pads, where the I/O pads allow for memory mapping between the processor 153 and other peripheral devices in the FCC 112.

The FPGA 152 may be radiation tolerant to help shield the computer from high frequency solar radiation which may otherwise damage the electronics housed therein. In one embodiment, the FPGA 152 may be a SmartFusion®2 FPGA from Microsemi Corporation of Aliso Viejo, California.

A plurality of serial ports 170 may be connected to the FCC 112 and in communication with the processor 153 and FPGA 152 via an input 176, such as a bus. In one embodiment, each serial port 170 may be a serial communication interface through which information is transferred in and out of the FCC 112 one bit at a time. In one embodiment, the serial port 170 interfaces with a controller chip, e.g., a Universal Asynchronous Receiver/Transmitter. The controller chip may be configured to take the parallel output of the FCC bus 160, as shown in FIG. 2, and transform the output into serial form for transmission though the serial port 170. The serial ports 170 may require minimal support software from the FPGA 152. The serial ports 170 may be gendered, i.e., male and female, such that a connector of the serial port 170 may only mate with a connector of the opposite gender. Generally speaking, the male serial port connectors have protruding pins, while female connectors have sockets. In one embodiment, a serial port 170 may have a male connector that may be mated to an output 174 that is female. The output 174 may be a cable that connects to an external element 172 such as a modem, transponder, and other external elements associated with the UAV's avionics.

A configuration may be created with the FPGA 152, providing enhanced flexibility for serial port to pin. In one embodiment, the FCC 112 may have an increased capacity of serial ports. In general, the constraints to the total number of serial ports are the number of physical I/O pins of the serial ports 170 and the size of the FPGA 152. In one embodiment, a plurality of, for example, twenty serial ports are disposed at the FCC 112.

The embodiment having twenty serial ports may provide substantial I/O for the FCC 112. Each of the twenty serial ports 170 may be connected to a different external element 172 of the FCC 112. For instance, there may be ports for buses, modems, data links, transponders, and the like. The twenty serial ports 170 may require minimal maintenance and may accurately distribute control without over-taxing the processor 153. In one embodiment, the serial ports 170 may reduce the amount of processing required of the processor 153. Furthermore, the 20 serial ports configuration may allow the FCC 112 to operate at lower power. For example, a typical Ethernet connection configuration uses approximately one watt of power, whereas the FCC may have a power usage at an approximate range measured in milliWatts (mW) of power.

The system for distributive control computing may further provide for monitoring the performance of the FCC 112. More specifically, and with respect to FIG. 4, the system includes auto-switch toggling from a first FCC 112 to a second FCC 113 in the event of malfunction. The FCCs 112, 113 are shown without the serial ports 170, as shown in FIG. 3, for clarity. In one embodiment, the first FCC 112 may be identical to the second FCC 113. In one embodiment, a selector 182 may be a microcontroller connected to the FCCs 112, 113 via outputs 185. Additionally, the selector 182 may have a configuration with no logic gates, transistors, and the like. In another embodiment, more than one selector may be connected to the FCCs 112,113.

Figure 4:
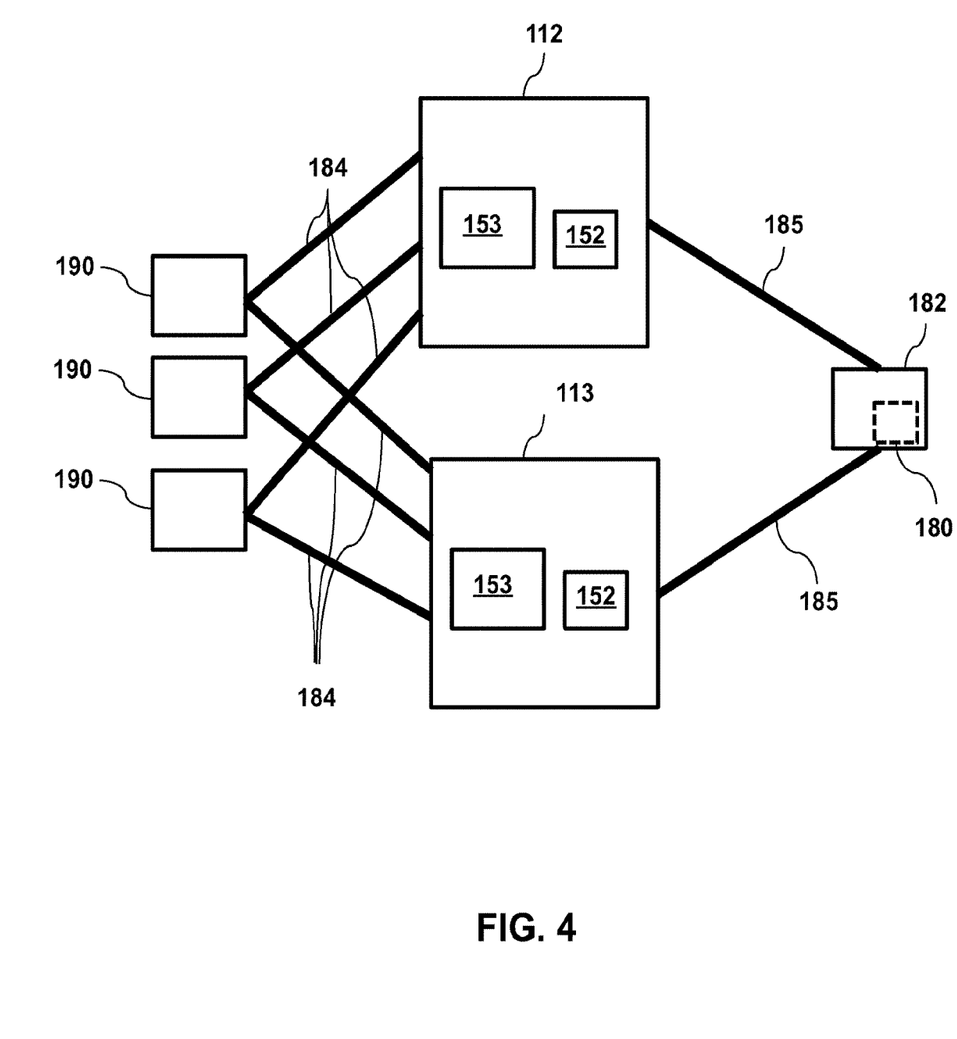
FIG. 4 depicts a system for monitoring the performance of two computing devices, according to one embodiment.

In one embodiment, an integrated watchdog window 180 may be located on a chip of the selector 182. In another embodiment the watchdog window 180 may be located on an external expansion card in the FCC's chassis. The watchdog window 180 may be in communication with the at least one selector 182 to monitor the electrical pulse, or "watchdog", emitted by each of the FCCs 112,113. Watchdog windows may be found in embedded systems that are not easily accessible to an operator, such as the FCCs 112,113 onboard the UAV. In such systems, the FCCs 112,113 may not rely on an operator to reboot the FCC in the case of malfunction.

In one embodiment, one or more sensors 190 may be connected to both FCCs 112, 113. In one embodiment, the system may include three sensors 190. In one embodiment, each sensor may be identical. Each sensor 190 may sense information relevant to the health and performance of the FCC via an output 184. The three sensors 190 may provide for a triple-redundant critical flight sensor system. In one embodiment, the FCCs 112, 113 may select a middle value of the redundant set of three sensors 190 to assess the performance of the FCCs 112, 113.

Figure 5:
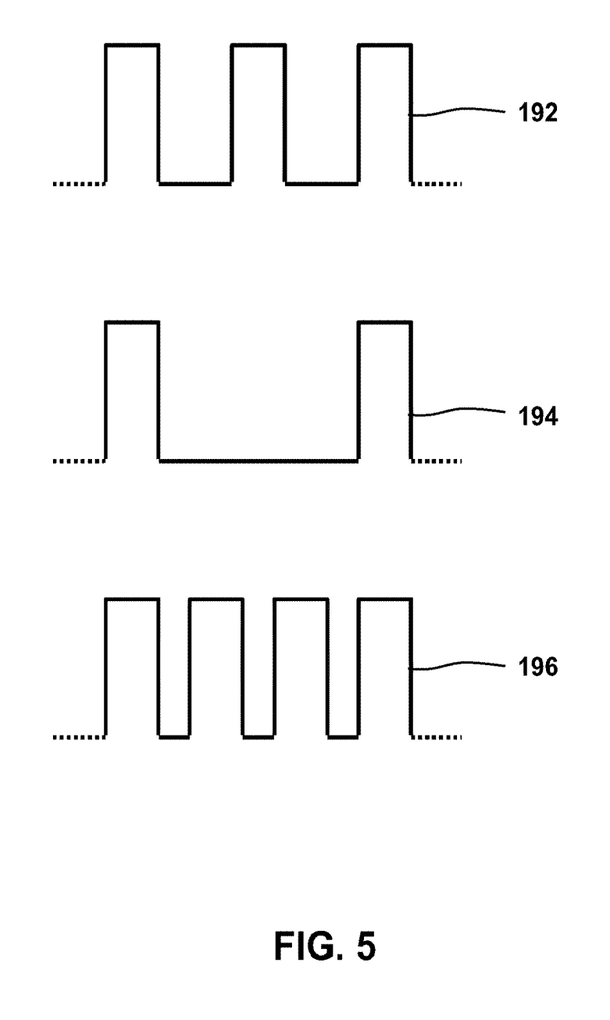
FIG. 5 depicts electrical pulses associated with a computing device for distributed control computing, according to one embodiment.

In one embodiment, the watchdog window 180 monitors an electrical pulse, or "heartbeat", generated by the FCC 112 as the heartbeat passes through the FCC's 112 circuitry. For example, and with respect to FIG. 5, a healthy pulse 192 may be monitored by the watchdog window 180, where the frequency window of the signal 192 is within the preferred range for a properly functioning first FCC 112, as shown in FIG. 4. At another time, the watchdog window 180 may detect a pulse that beats too slowly or skips a beat, such as pulse 194. At yet another time, the watchdog window 180 may detect a pulse that beats too quickly, such as pulse 196. In one embodiment, performance specifications may require that the frequency and amplitude of the FCC heartbeat be within a certain percentage range of a baseline pulse. In one embodiment, if the signal 192 is outside of the frequency window, e.g., the heartbeat is too fast or too slow, then the FCC 112 will be reset. A fault pulse may be a pulse that is outside a preferred range, a pulse that skips a beat, a pulse that is slower than the preferred range, a pulse that is faster than a preferred range, a pulse that has a frequency and amplitude outside of a preferred range of a baseline pulse.

In one embodiment, if the watchdog window 180 does not detect a heartbeat or if the detected heartbeat is abnormal, e.g., a lag in time between successive pulses, of the first or active FCC 112, the watchdog window 180 may communicate to the selector 182 to toggle to the second or backup FCC 113. In one embodiment, power to the first FCC 112 is reset and any identified issues may be resolved through the resulting resetting of the memory and processor. Accordingly, the first FCC 112 may be back up and running again shortly after a power cycle and therefore, the UAV may sustain continuous flight. Additionally, since the selector 182 may have toggled to the healthy second or backup FCC 113, continuous flight is not disturbed while running on the second or backup FCC 113. In some embodiments, the second or backup FCC 113 may be a duplicate of the first FCC 112.

In one embodiment, if a healthy pulse is detected for in-charge FCC 112 by the watchdog window 180, but no pulse is detected by the watchdog window 180 for the backup FCC 113, then selector 182 does not toggle to the backup FCC 113. In one embodiment, each FCC 112, 113 may last approximately 8 hours or more, which may be sufficient time to land the UAV after failure of one of the FCCs 112, 113. In the case where power may have been completely cut off and neither FCC is able to power up and function, the UAV may implement a landing procedure. In one embodiment, the landing procedure may be implemented by activation of a flight termination system.

Figure 6:
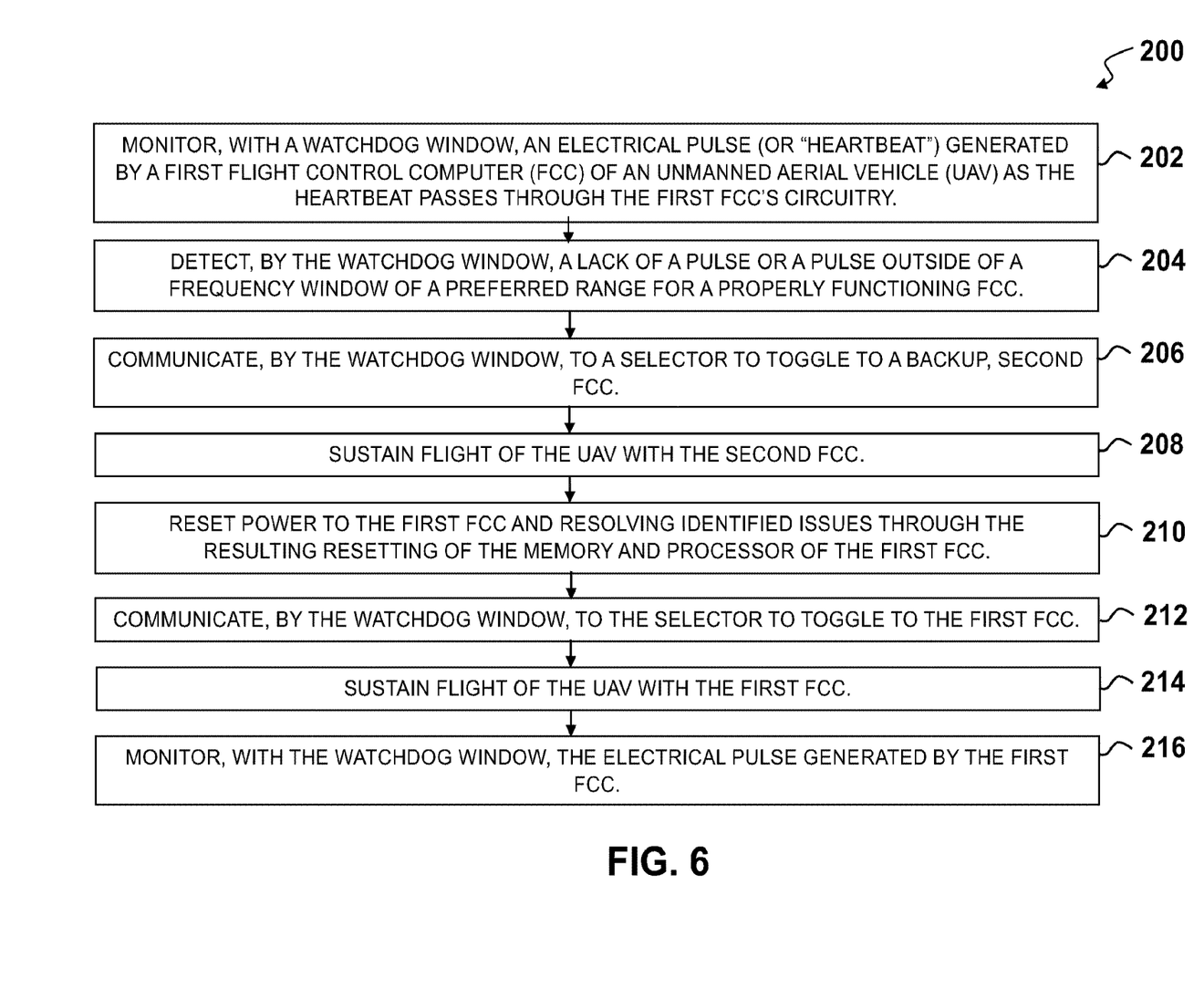
FIG. 6 depicts a flow diagram of a method for distributed control computing for monitoring the performance of a flight control computer, according to one embodiment.

With respect to FIG. 6, a flowchart for a method 200 of distributive control computing for monitoring the performance of an FCC is illustrated. In one embodiment, a watchdog window, such as watchdog window 180 may be in communication with the at least one selector, such as selectors 182 to monitor the electrical pulse, or "watchdog", emitted by FCCs, such as FCCs 112,113. The watchdog window monitors an electrical pulse (or "heartbeat") generated by a first FCC as the heartbeat passes through the first FCC's circuitry (step 202). In one embodiment, performance specifications may require that the frequency and amplitude of the first FCC heartbeat be within a certain percentage range of a baseline pulse. The watchdog window may detect a lack of a pulse or that the pulse is outside of a frequency window of a preferred frequency range for a properly functioning FCC (step 204). The watchdog window may detect a fault pulse. A fault pulse may be a pulse that is outside a preferred range, a pulse that skips a beat, a pulse that is slower than the preferred range, a pulse that is faster than a preferred range, a pulse that has a frequency and amplitude outside of a preferred range of a baseline pulse. The watchdog window may communicate to the selector to toggle to a backup, second FCC (step 206). The second FCC may then control the UAV and sustain flight of the UAV (step 208). Power to the first FCC may be reset and any identified issues may be resolved through the resulting resetting of the memory and processor (step 210). Accordingly, the first FCC may be back up and running again shortly after a power cycle and therefore, the UAV may sustain continuous flight. The selector may communicate, by the watchdog window, to toggle back to the first FCC once the first FCC is running (step 212). The UAV may sustain flight with the first FCC once the first FCC is running (step 214). The watchdog window may continue to monitor the electrical pulse generated by the first FCC (step 216).

Figure 7:
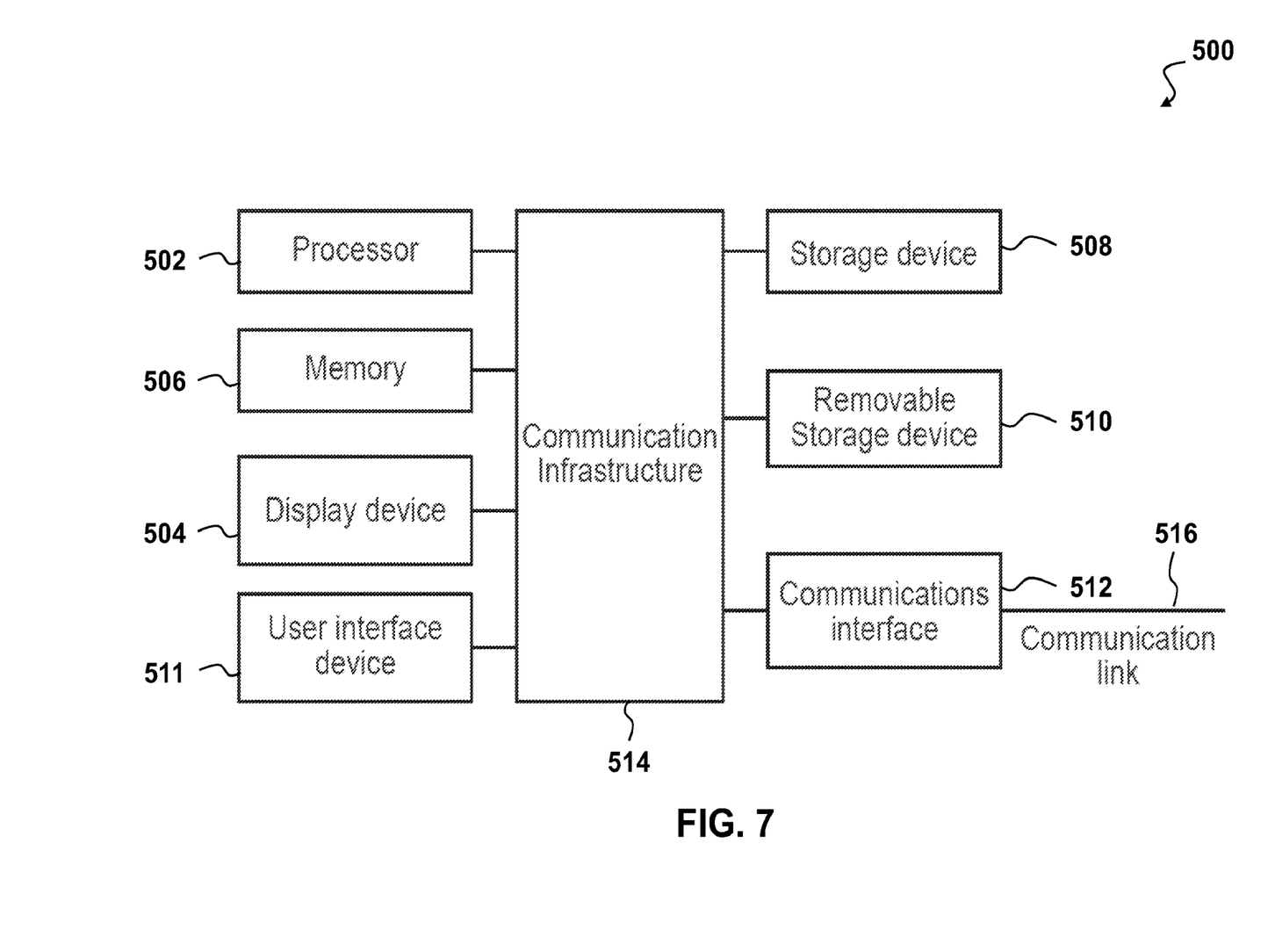
FIG. 7 shows a high-level block diagram and process of a computing system for implementing an embodiment of the system and process.

FIG. 7 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
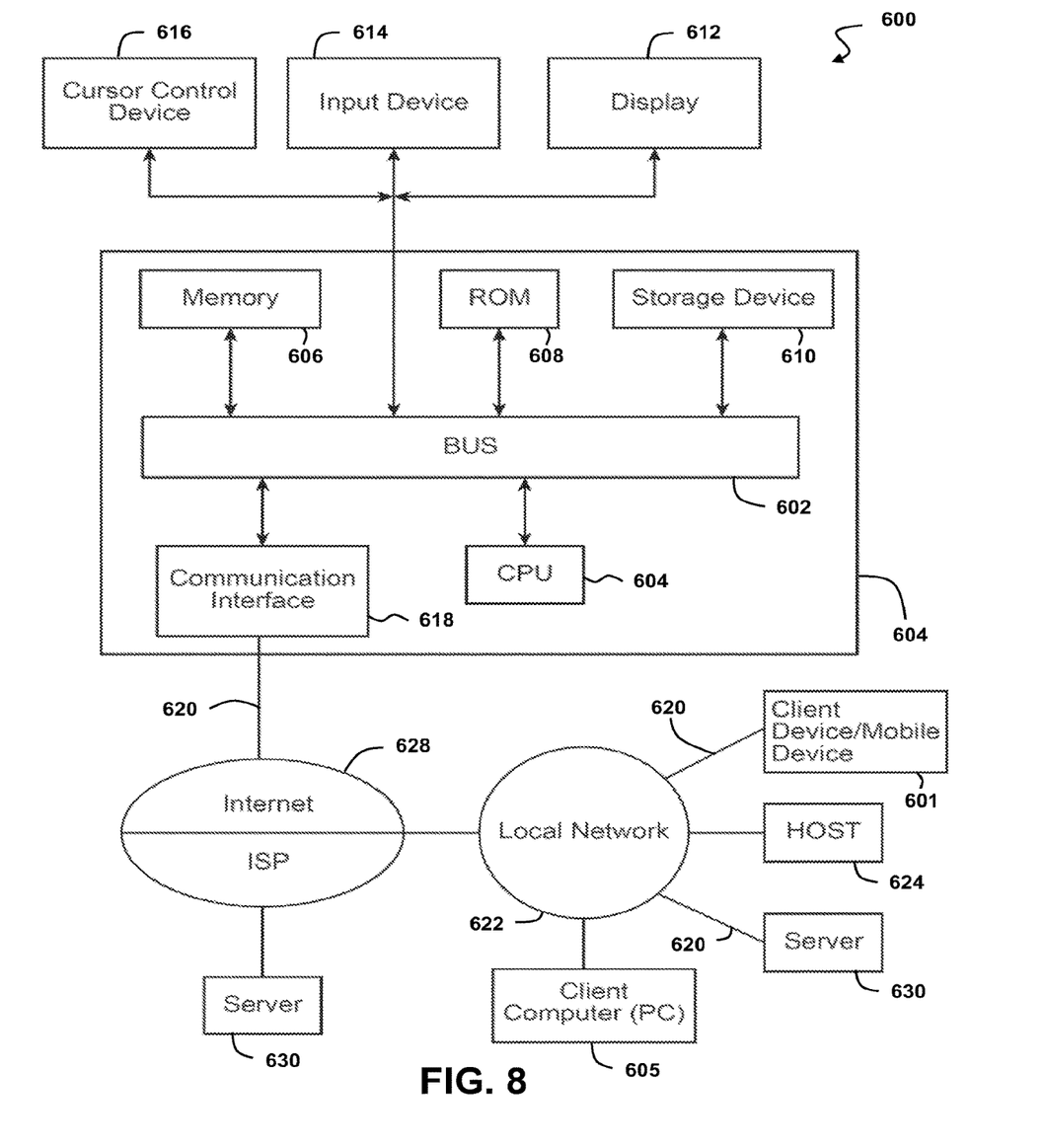
FIG. 8 shows a block diagram and process of an exemplary system in which an embodiment may be implemented.

FIG. 8 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 9:
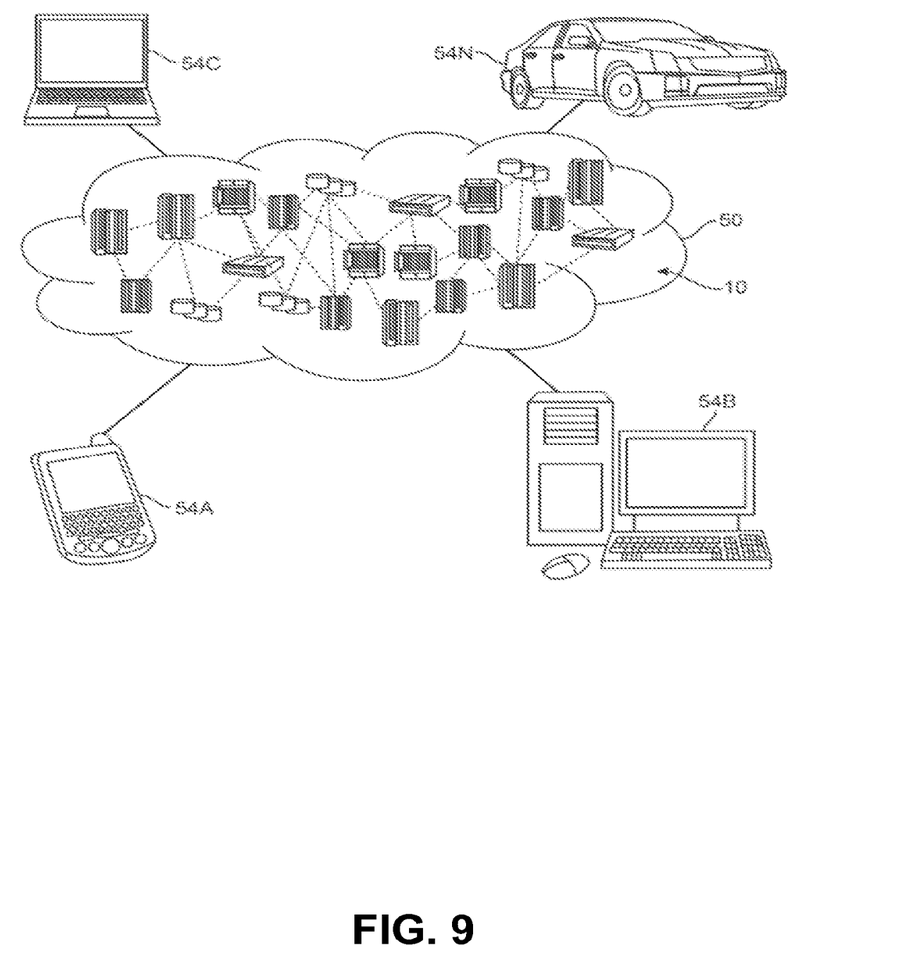
FIG. 9 depicts a cloud computing environment for implementing an embodiment of the system and process disclosed herein.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
    a first flight control computer (FCC) of two or more FCCs;
    a second FCC of the two or more FCCs;
    at least one selector in communication with the first FCC and the second FCC;
    at least one watchdog window in communication with the at least one selector, wherein the at least one watchdog window monitors a performance of the first FCC based on a first electrical pulse emitted by the first FCC, and wherein the at least one watchdog window monitors a performance of the second FCC based on a second electrical pulse emitted by the second FCC; and
    a flight termination system;
    wherein the at least one watchdog window is configured to detect a first fault pulse of the first electrical pulse emitted by the first FCC, wherein the detected first fault pulse is a pulse that is outside a predetermined frequency range and a predetermined amplitude range;
    wherein the at least one watchdog window is configured to detect a second fault pulse of the second electrical pulse emitted by the second FCC;
    wherein the selector is configured to toggle to the second FCC based on the detected first fault pulse emitted by the first FCC if there is no detected second fault pulse of the second electrical pulse emitted by the second FCC;
    wherein the flight termination system is configured to implement a landing procedure based on the detected first fault pulse emitted by the first FCC and the detected second fault pulse emitted by the second FCC;
    wherein after toggling to the second FCC, the selector is further configured to reset power to the first FCC; and
    wherein the selector is configured to toggle to the first FCC after the power has been reset to the first FCC.

2. The system of claim 1, wherein the detected fault pulse is slower than the predetermined frequency range.

3. The system of claim 1, wherein the detected fault pulse is faster than the predetermined frequency range.

4. The system of claim 1, wherein the detected fault pulse is a pulse that has a frequency and amplitude outside of the predetermined frequency range and the predetermined amplitude range of a baseline pulse.

5. The system of claim 1, wherein the at least one watchdog window is further configured to monitor the performance of the first FCC after the first FCC is toggled by the selector.

6. A method comprising:
- monitoring, via a watchdog window, a performance of a first flight control computer (FCC) of two or more FCCs, wherein the performance is based on a first electrical pulse emitted by the first FCC;
- monitoring, via a watchdog window, a performance of a second FCC of the two or more FCCs, wherein the performance is based on a second electrical pulse emitted by the second FCC;
- detecting, via the watchdog window, a first fault pulse of the first electrical pulse emitted by the first FCC, wherein the detected first fault pulse is a pulse that is outside a predetermined frequency range and a predetermined amplitude range;
- detecting, via the watchdog window, a second fault pulse of the second electrical pulse emitted by the second FCC;
- toggling, by a selector in communication with the watchdog window, to a second FCC based on the detected fault pulse emitted by the first FCC if there is no detected second fault pulse of the second electrical pulse emitted by the second FCC;
- resetting, via the selector, power to the first FCC after toggling to the second FCC;
- toggling, by the selector, to the first FCC after the power has been reset to the first FCC; and
- implementing, by a flight termination system, a landing procedure based on the detected first fault pulse emitted by the first FCC and the detected second fault pulse emitted by the second FCC.

7. The method of claim 6, wherein the detected fault pulse is slower than the predetermined frequency range.

8. The method of claim 6, wherein the detected fault pulse is faster than the predetermined frequency range.

9. The method of claim 6, wherein the detected fault pulse is a pulse that has a frequency and amplitude outside of the predetermined frequency range and the predetermined amplitude range of a baseline pulse.

10. The system of claim 6, further comprising:
- monitoring, via the watchdog window, the performance of the first flight control computer (FCC) after the first FCC is toggled by the selector.

* * * * *